United States Patent
Losak et al.

(10) Patent No.: US 7,736,037 B2
(45) Date of Patent: Jun. 15, 2010

(54) BI-FUNCTIONAL LIGHTING MECHANISM BASED ON ROTARY ACTUATOR

(75) Inventors: Libor Losak, Koprivnice (CZ); Vladimir Dobrus, Opava (CZ); Jiri Kopenec, Koprivnice (CZ)

(73) Assignee: Visteon Global Technologies, Inc., Van Buren Township, MI (US)

( * ) Notice: Subject to any disclaimer, the term of this patent is extended or adjusted under 35 U.S.C. 154(b) by 732 days.

(21) Appl. No.: 11/421,815

(22) Filed: Jun. 2, 2006

(65) Prior Publication Data

US 2007/0279601 A1 Dec. 6, 2007

(51) Int. Cl.
*B60Q 1/14* (2006.01)
*B60Q 1/00* (2006.01)
*F21V 17/02* (2006.01)
*F21V 11/00* (2006.01)

(52) U.S. Cl. ............... 362/539; 362/280; 362/281; 362/282; 362/283; 362/284; 362/322; 362/324; 362/512; 362/513; 362/547

(58) Field of Classification Search ......... 362/280–284, 362/512–513, 539, 322, 324, 547, 294
See application file for complete search history.

(56) References Cited

U.S. PATENT DOCUMENTS

| 1,397,803 | A | 11/1921 | Ensor et al. |
| 1,536,085 | A | 5/1925 | Douglas |
| 1,557,277 | A | 10/1925 | Stoney |
| 1,658,679 | A | 2/1928 | Hill et al. |
| 1,782,629 | A | 11/1930 | Pape |
| 1,882,137 | A | 10/1932 | Frochtenicht |
| 2,119,597 | A | 6/1938 | Morea |
| 5,213,406 | A | 5/1993 | Neumann et al. |
| 5,842,774 | A | 12/1998 | Sur |
| 6,280,067 | B1 | 8/2001 | Albou |
| 6,467,940 | B2 | 10/2002 | Eschler et al. |
| 6,695,466 | B2 | 2/2004 | Naganawa et al. |
| 6,857,768 | B2 | 2/2005 | Watanabe et al. |
| 6,874,923 | B2 | 4/2005 | Albou et al. |
| 2006/0164852 | A1* | 7/2006 | Mochizuki et al. .......... 362/539 |

FOREIGN PATENT DOCUMENTS

| JP | 2000-215717 | 4/2000 |
| JP | 2001-60403 | 6/2001 |
| JP | 2002-056707 | 2/2002 |

* cited by examiner

*Primary Examiner*—Sandra L O'Shea
*Assistant Examiner*—Sean P Gramling
(74) *Attorney, Agent, or Firm*—Brinks Hofer Gilson & Lione

(57) ABSTRACT

A projector assembly having a light source and a reflector body positioned proximately to the light source for reflecting light forward along an axis of the projector assembly. Mounted to the reflector body is a lens. The lens is in front of and at a distance from the light source to focus the light into a beam pattern. An actuator is mounted to the reflector body and includes a pair of rotatable shafts extending from opposing ends along an axis that is perpendicular to and below the axis of the projector assembly. A light shield is mounted onto the rotatable shafts of the actuator and is rotatable between a first position, wherein substantially all of the light below the axis of the projector assembly is blocked, and a second position, wherein at least a portion of the light below the axis of the projector assembly is allowed to project forward through the lens.

14 Claims, 5 Drawing Sheets

BI-FUNCTIONAL LIGHTING MECHANISM BASED ON ROTARY ACTUATOR

BACKGROUND

1. Field of the Invention

The invention relates generally to a projector assembly for an automotive vehicle headlamp and more particularly to a projector assembly having a bi-functional mechanism for switching between high beam and low beam conditions.

2. Related Technology

In prior art projector assemblies, the bi-functional lighting units, units with high and low beam operational modes, use mechanical solutions with a movable shield. However, an actuator provides translational movement, typically through a magnet or solenoid. The actuator is typically located on the side of the light assembly and, thus, the translational movement of the actuator must be converted to rotational movement of the shield. This conversion requires multi-jointed linkage components and, therefore, large packaging requirements. These additional components and linkage mechanisms have a negative impact on accuracy, reliability, and packaging concerns.

SUMMARY

In overcoming the above limitations and other drawbacks, a projector assembly according to the present invention includes a projector unit having a light source and a reflector body positioned proximately to the light source and adapted to reflect light forward along an axis of the projector assembly. A lens is mounted to the reflector body, in front of and at a distance from the light source. The lens is adapted to focus light passing therethrough into a beam pattern along the axis of the projector assembly.

An actuator is located adjacent to the reflector body and has a pair of rotatable shafts extending from opposing ends of the actuator, generally along an axis that is perpendicular to and positioned below the projector axis of the projector assembly. A shield is mounted to the rotatable shafts of the actuator such that the shield can be rotated about the axis of the rotatable shafts between a first position and a second position. In the first position, the shield is substantially vertical and the shield extends upward to about the axis of the projector assembly, thereby blocking substantially all of the light below the axis of the projector assembly. In its second position, the shield is rotated forward and downward such that the shield is positioned below the axis of the projector assembly. This allows at least a portion of the light below the axis of the projector assembly to also project forward through the lens.

In one construction, the shield includes tabs extending away from the rotatable shafts opposite the shield portion and counter weights are mounted onto the tabs. The counter weights are preferably located at a distance from the axis of the rotatable shafts such that the counter weights will assist the shield portion in rotating into an upright position (for low beam operation of the projector assembly). In the event of failure of the actuator or an associated return spring, the counter weights will cause the shield to rotate as such into this "fail-safe" position, in the event the actuator fails. The exact location of the counter weights on the tabs will depend on the specific design details of the shield, actuator and any associated biasing means. In one possible configuration, the counterweights may be located such that the center of gravity of the shield and counter weights is located on or approximately on the axis of the rotatable shafts.

In another aspect of the invention, a heat shield is positioned between the actuator and the light source to prevent light from directly impacting the actuator.

In one construction, the actuator is mounted to and generally within the interior of the reflector body. In an alternative construction, the actuator is mounted to a support frame that also supports the reflector body.

In yet another aspect of the invention, the return spring mentioned above is mounted within the actuator or, alternatively, exterior to the actuator, to maintain the rotating shaft and the shield in the upright, first or low beam position when the actuator is not activated. The actuator is configured to provide sufficient torque to overcome the biasing spring and move the rotating shafts and the shield to the second position when the actuator is actuated.

In still another aspect of the invention, a lens holder is mounted directly onto the reflector body and the lens is mounted onto the lens holder. The lens holder is configured to support the lens in alignment with the axis of the projector assembly and at a predetermined distance from the light source.

In yet another aspect of the invention, the light source is an electric discharge lamp and the actuator is an electric motor.

Therefore, there is a need for a bi-functional projector assembly that eliminates the need for complex linkages to convert translational motion to a rotating shield being used to switch between the high beam and low operating beam conditions.

Further objects, features and advantages of this invention will become readily apparent to persons skilled in the art after a review of the following description, with reference to the drawings and claims that are appended to and form a part of this specification.

DETAILED DESCRIPTION

Figure 1:
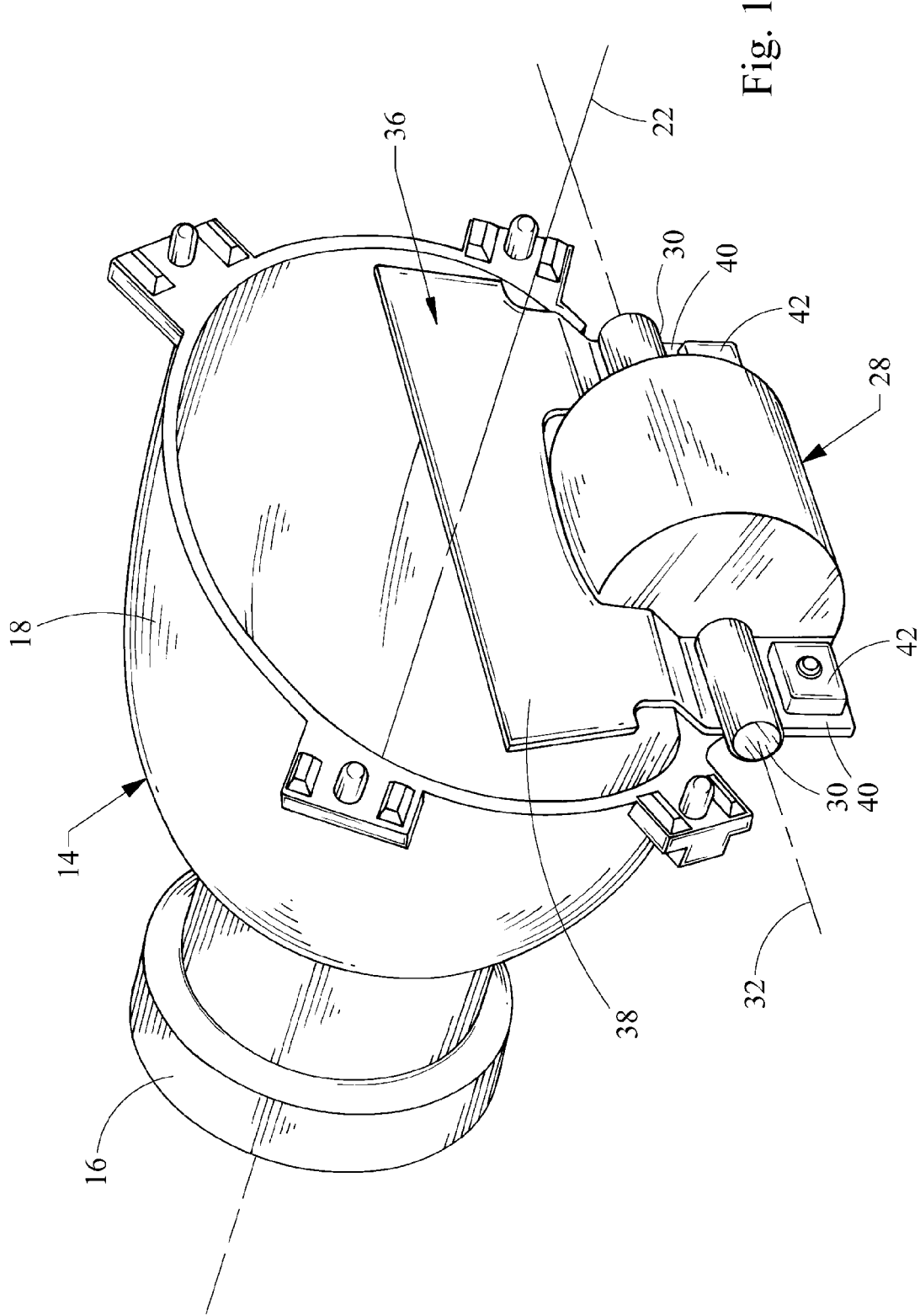
FIG. 1 is a perspective view of a projector assembly embodying the principles of the present invention wherein the lens and the light source have been removed.
Figure 2:
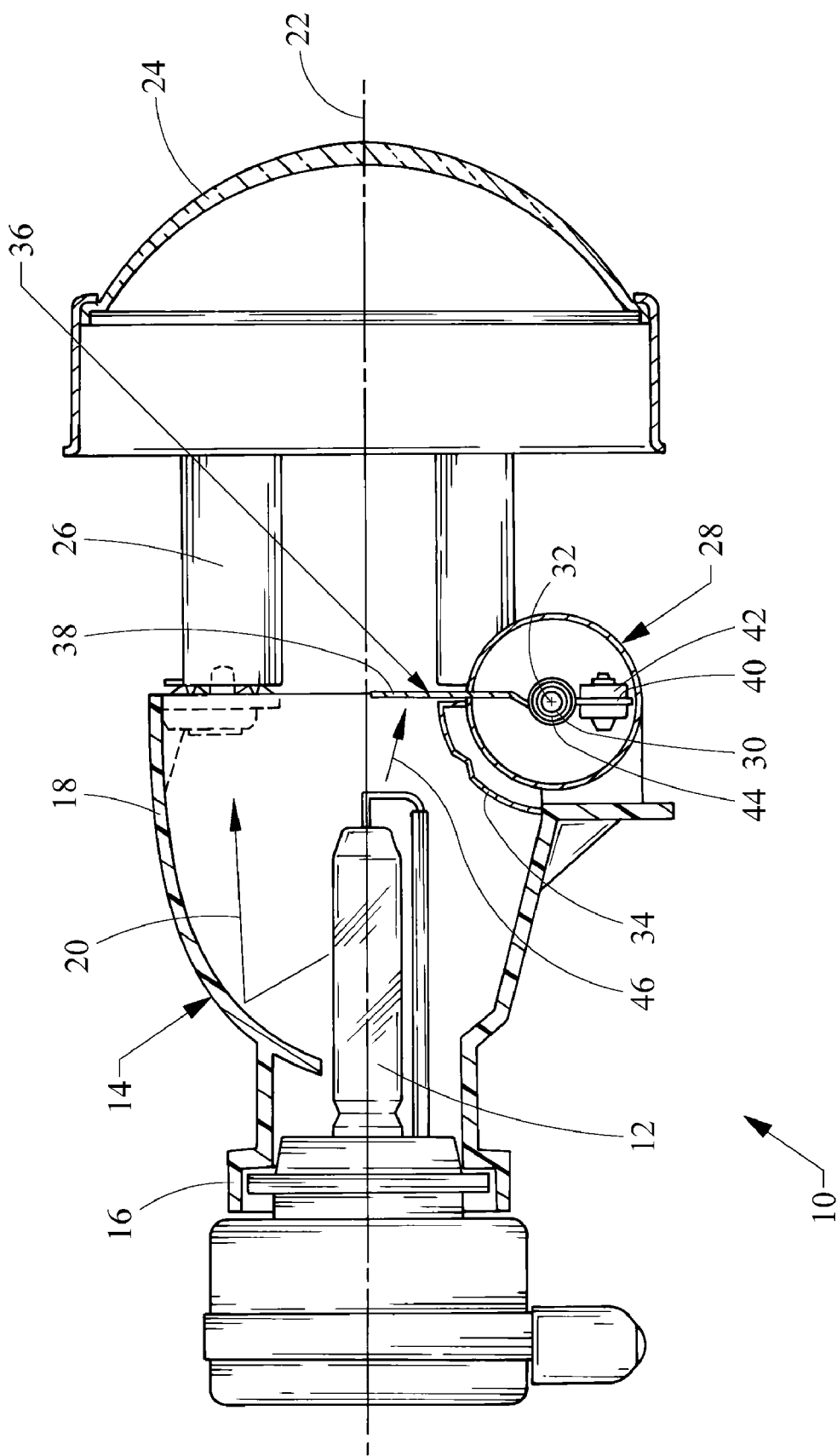
FIG. 2 is a side sectional view of the projector assembly, wherein the shield is shown in a first position, blocking substantially all of the light below an axis of the projector assembly.
Figure 3:
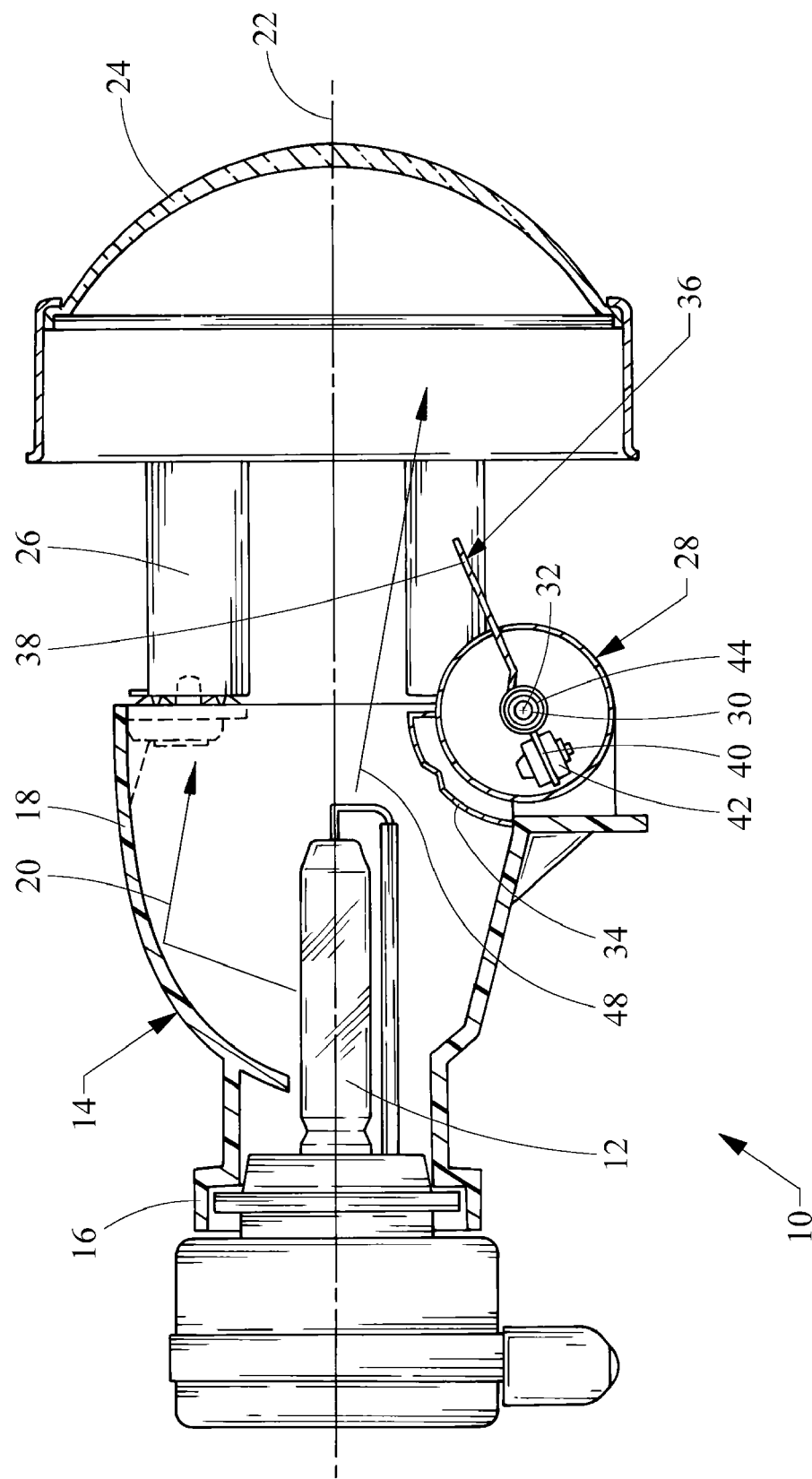
FIG. 3 is a side sectional view similar to FIG. 2, wherein the shield is shown in a second position, where the shield allows at least a portion of the light below the axis of the projector assembly to pass out of the assembly.

Referring to FIGS. 1-3, a projector assembly in accordance with the present invention is generally shown at 10. The projector assembly 10 includes a light source 12. Preferably, and as shown, the light source 12 is an electric discharge lamp however, it is to be understood that the present invention could be practiced with other types of light sources.

The light source 12 is mounted within a reflector body 14 that includes a support portion 16 that supports the light source 12 therein, and a reflective portion 18 that is positioned proximately to the light source 12 and is adapted to reflect light from the light source 12. The reflective portion 18 is shaped such that light from the light source 12 is reflected forward as indicated by arrows 20. Light from the light source 12 is reflected forward generally along an axis 22 of the projector assembly 10.

A lens 24 is mounted to the reflector body 14, in front of and at a distance from the light source 12. As shown, a lens holder 26 is mounted directly onto or integrally formed with the reflector body 14 and the lens 24 is mounted onto the lens holder 26. The lens holder 26 is configured to support the lens 24 along the axis 22 of the projector assembly 10 and at a distance from the light source 12. As is known in the art, the lens 24 is adapted to focus light passing through the lens 24 into a beam pattern. The distance at which the lens 24 is placed from the light source 12 is determined based on the type of light source 12, the shape of the reflector body 14 and the desired characteristics of the resultant beam.

Figure 4:
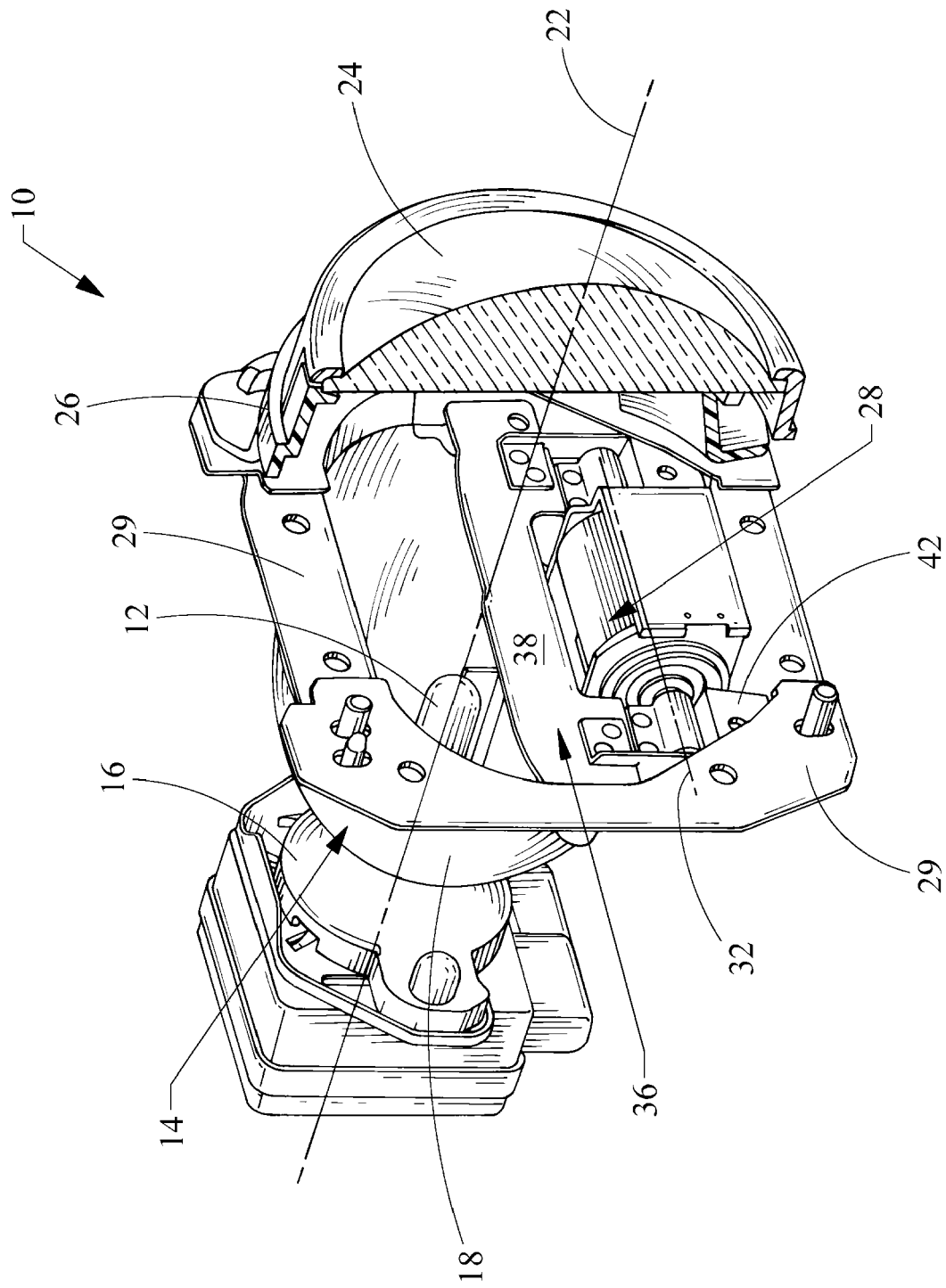
FIG. 4 is a perspective view, with portions broken away, of an alternate embodiment of the projector assembly.
Figure 5:
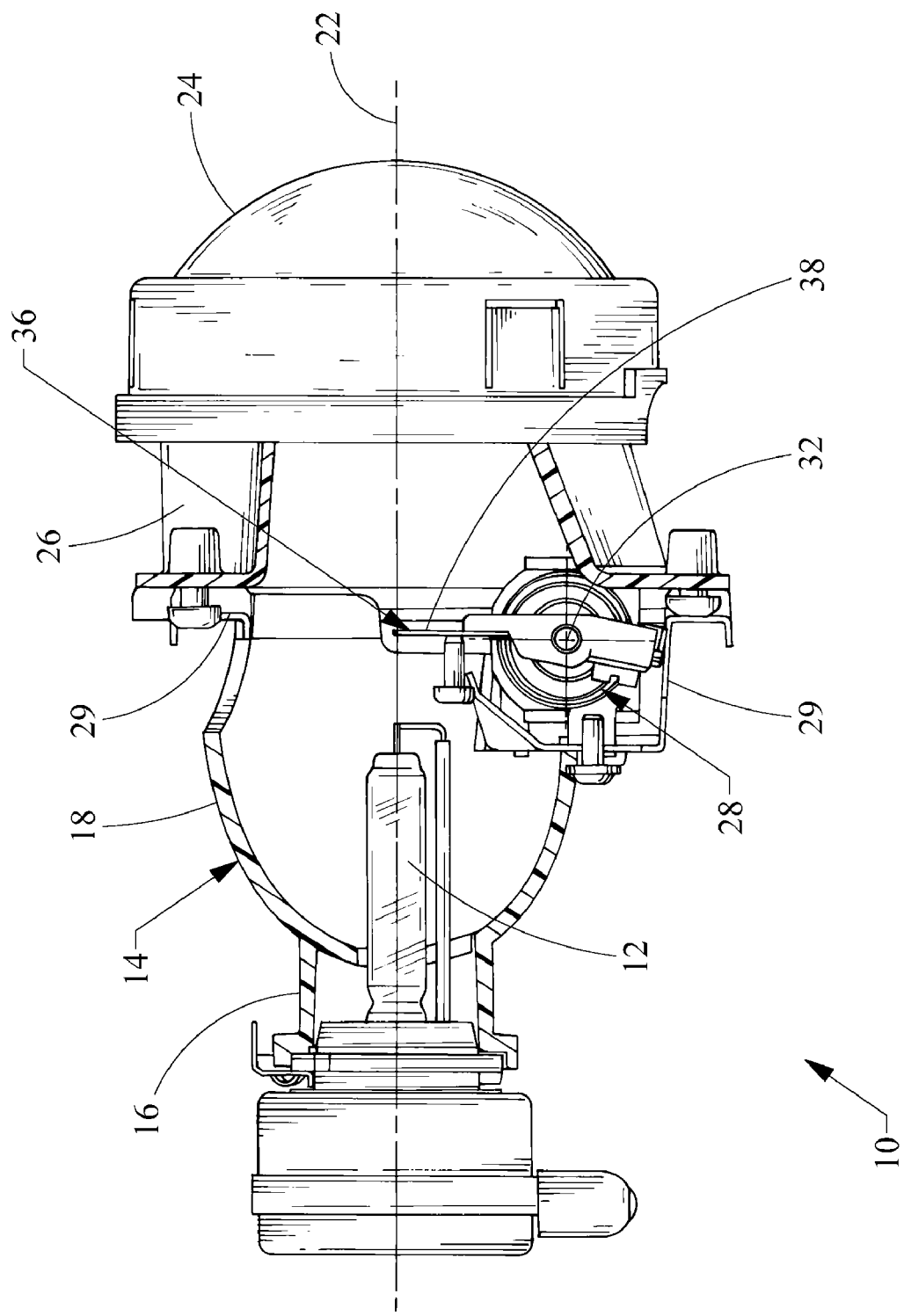
FIG. 5 is a side sectional view of the projector assembly seen in FIG. 4.

An actuator 28 is mounted to the reflector body 14, its support portion 16 or at another appropriate location of the assembly. In the illustrated embodiment, the actuator 28 is mounted directly to and at least partially within the interior of the reflector body 14, such that the over-all dimensions of the projector assembly 10 are not greatly increased by the actuator 28. In an alternative embodiment, as seen in FIGS. 4 and 5, the actuator 28 may be mounted to a support frame 29, which also supports the reflector body 14

The actuator 28 includes a pair of rotatable shafts 30 extending from opposing ends of the actuator 28. The rotatable shafts 30 define an axis 32 that is perpendicular to and, additionally, positioned below (according to the orientation of FIG. 2) the axis 22 of the projector assembly 10. The actuator 28 can be any appropriate device, such as an electric motor, that provides rotational movement to the shafts 30. As shown, a heat shield 34 is additionally positioned between the actuator 28 and the light source 12 to prevent light from directly impacting the actuator 28. The heat shield 34 will thus block light and heat from the heat source 12, operating to keep the actuator 28 cooler.

A light shield 36 is mounted to the rotatable shafts 30 of the actuator 28. The light shield 36 includes a shield portion 38 and tabs 40. The shield portion 38 extends generally radially from the rotatable shafts 30 on either side of the actuator 28 and straddles the actuator 28, as seen in FIG. 1. The light shield 36 is rotatable, along with the rotatable shafts 30, about the axis 32 between a first position (FIG. 2) and a second position (FIG. 3).

Referring to FIG. 2, in the first position, the shield portion 38 is oriented substantially upright or vertical and the shield portion 38 thus extends upward to about the axis 22 of the projector assembly 10. When the light shield 36 is in this first position, the shield portion 38, along with the actuator 28, operates to block substantially all of the light below the axis 22 of the projector assembly 10, as shown by arrow 46. This will provide a less intense or low beam light as is known in the art.

Referring to FIG. 3, in the second position, the light shield 36 is rotated about the axis 32 of the rotatable shafts 30 such that the shield portion 38 is moved forward and downward, clockwise in the figures, relative to the light source 12 and the axis 22. Accordingly, in the second position, the shield portion 38 is re-positioned below the axis 22 of the projector assembly 10, thereby allowing light below the axis 22 of the projector assembly 10 to project forward through the lens 24, as shown by arrow 48. This will provide a more intense or high beam light as is known in the art.

As mentioned above, the light shield 36 further includes tabs 40. The tabs extend away from the rotatable shafts 30 generally opposite the shield portion 38. Counter weights 42 are mounted onto the tabs 40 at a predetermined distance from the axis 32 of the rotatable shafts 30. In one construction, the weight of the shield portion 38 extending to one side of the rotatable shafts 30 is approximately equal to the weight of the counterweights 42 and tabs 40 on the opposing side. The counterweights 42 may be spaced from the rotatable shafts 30 such that the center of gravity defined by the light shield 36, tabs 40 and counter weights 42 is located approximately on the axis 32 of the rotatable shafts 30. This makes the light shield 36 balanced and minimizes the torque required to rotate the light shield 36. Alternatively, the counter weights 42 may be located on the tabs 40 such that the counter weights 42 will cause the light shield 36 to rotate to the first position in the event the actuator 28 or a return spring 44 (discussed below) fails. Thus, in a "fail-safe" mode of operation, the light shield 36 is moved into its low beam operational position. Thus, the exact position of the counter weights 42 will depend on the specific design of the actuator 28, light shield 36 and return spring 44.

Preferably, a return spring 44 is associated with the actuator 28. As seen in FIGS. 1-3, the return spring 44 is integral with and provided internal to the actuator 28. As an alternative, the construction of the projector assembly 10 may locate the return spring 44 external to the actuator 28.

The return spring 44 is coupled to the rotatable shafts 30 so as to bias the rotatable shafts 30 and the light shield 36 toward the first position. Thus, when the actuator 28 is not activated, the light shield 36 will be automatically return to the first position. This allows for one-way operation of the actuator 28 and provides a fail-safe low beam condition in the unlikely event the actuator 28 fails. Because the light shield 36 is balanced on the rotatable shafts 30 of the actuator 28, the actuator 28 only needs to provide torque sufficient to overcome the return spring 44 in order to rotate the shafts 30 and thereby move the light shield 36 from the first position to the second position. Once the actuator 28 is deactivated, the return spring 44 will rotate the rotatable shafts 30, and the light shield 36, back to the first position.

It is therefore intended that the foregoing detailed description be regarded as illustrative rather than limiting, and that it be understood that it is the following claims, including all equivalents, that are intended to define the spirit and scope of this invention.

What is claimed is:

1. A projector assembly comprising:
   a light source;
   a reflector body positioned proximately to the light source and adapted to reflect light forward generally along an assembly axis;
   a lens mounted to the reflector body and located forward of and at a distance from the light source, the lens being configured to focus light passing therethrough into a beam pattern generally along the assembly axis;
   an actuator having a pair of rotatable shafts extending from opposing ends of the actuator along a rotational axis, the rotational axis being generally perpendicular to and spaced apart from the assembly axis, wherein the actuator includes an actuator body that is directly mounted to the reflector body and at least partially within an interior of the reflector body;
   a light shield having a shield portion mounted to the rotatable shafts of the actuator, the light shield and the rotatable shafts being rotatable about the rotational axis between a first position or a second position, in the first position the shield portion extending substantially upward toward the axis of the projector assembly thereby blocking light below the assembly axis, in the second position the shield portion being rotated forward and downward relative to the assembly axis such that the shield portion is positioned below the assembly axis thereby allowing a portion of the light below the assembly axis to project forward through the lens, the light shield further including at least one tab extending away from the shield portion on an opposite side of the rotatable shafts and the rotational axis; and counterweights mounted onto the tabs, the counterweights located at a distance from the rotational axis such that the weight of the shield portion extending from one side of the rotatable shafts and the rotational axis is approximately equal to the weight of the counterweights and the tabs on the other side of the rotatable shafts and the rotational axis and such that a center of gravity of the light shield and the counterweights is located approximately on the rotational axis.

2. The projector assembly of claim 1 wherein a heat shield is positioned between the actuator and the light source thereby preventing light from directly impacting the actuator.

3. The projector assembly of claim 1 wherein a support frame supports the actuator and the reflector body.

4. The projector assembly of claim 1 wherein a return spring is coupled to the shield and configured to bias the shield into the first position when the actuator is not activated.

5. The projector assembly of claim 4 wherein the return spring is integral with and internal to the actuator.

6. The projector assembly of claim 4 wherein the actuator is adapted to provide sufficient torque to overcome the return spring to move the rotating shafts and the shield into the second position when the actuator is actuated.

7. The projector assembly of claim 1 further comprising a lens holder, the lens being mounted onto the lens holder and the lens holder supporting the lens in alignment with the axis of the projector assembly.

8. The projector assembly of claim 7 wherein the lens holder is mounted directly to the reflector body.

9. The projector assembly of claim 1 wherein the light source is an electric discharge lamp.

10. The projector assembly of claim 1 wherein the actuator is an electric motor.

11. The projector assembly of claim 1 wherein the rotational axis is spaced below the assembly axis relative to ground when assembled into an automotive vehicle.

12. The projector assembly of claim 1 provided in an automotive vehicle.

13. The projector assembly of claim 1 wherein in the second position, the light shield is located closer toward the lens than in the first position.

14. The projector assembly of claim 1 wherein the counterweights are located at a distance from the rotational axis such that the shield portion of the light shield is biased toward the first position.

* * * * *